Nov. 17, 1931.        J. BROWN ET AL        1,832,357
WIND ACTUATED APPARATUS
Filed Dec. 15, 1930

John Brown & Edward Brown
Invs.
By Cashmore & Co. Attys.

Patented Nov. 17, 1931

1,832,357

UNITED STATES PATENT OFFICE

JOHN BROWN AND EDWARD BROWN, OF WEDNESBURY, ENGLAND

WIND ACTUATED APPARATUS

Application filed December 15, 1930, Serial No. 502,546, and in Great Britain December 16, 1929.

This invention comprises certain improvements in or relating to wind actuated mechanism particularly applicable to mascots for motor road vehicles, and it has for its main object a mascot, for instance a bird, in which the flapping of the wings is performed in a very realistic manner.

According to the present improvements, the wings are caused to flap by wind pressure incident thereon, and by means provided to tilt the wings at the end of each stroke to expose alternate faces of the wings to the wind. Thus when the wings reach the limit of the downward stroke they are tilted to expose the under face of the wings and the wind incident thereon will cause the wings to move in an upward direction when they are again tilted at their limit of the upward stroke to expose the top face of the wings. The inner end of each wing is connected to a member or members in such a manner that the up and down movement of the wings is transmitted to these members. These members are also connected to a stationary part of the device by means of cranked members so that the aforesaid up and down movement is augmented by a pivotal or oscillatory movement about the point of connection to the wing. Thus at the end of each up or down stroke of the member connected to the wing it is tilted to tilt the wing and expose the other face of the wing to the wind. A flywheel is arranged between each connecting member to assist the movement of the wings and to secure balance of the reciprocating parts. Each end of the said connecting members is also suitably weighted for the same purpose. Springs may be also provided to assist the movement of the wings, the springs being compressed and released alternatively with the movement of the connecting members. The release of the springs occurs and the flywheel is so weighted that the movement of the wings is assisted for the reversal at the top and bottom.

Referring to the drawings:—

Figure 5 is a face view of a connecting rod member hereinafter referred to.

Figure 2:
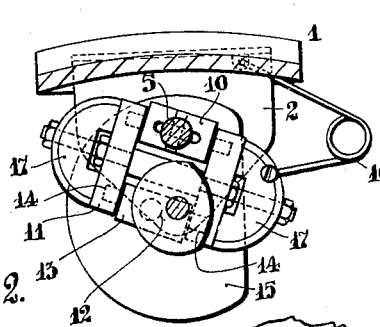
Figure 2 is a section on the line xx of Figure 3.
Figure 3:
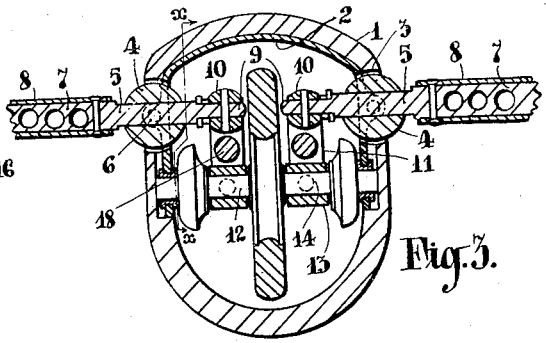
Figure 3 is a section on the line YY of Figure 1.
Figure 1:
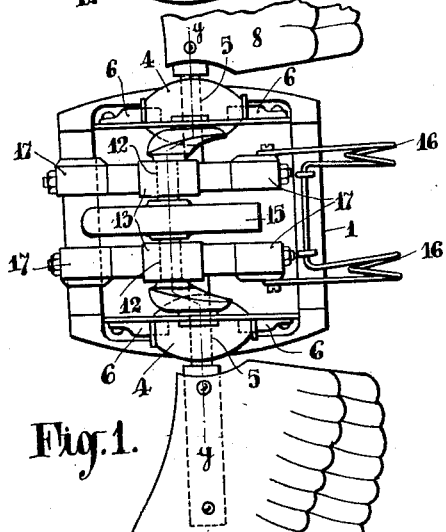
Figure 1 is an underside view of mechanism constructed according to this invention.
Figure 4:
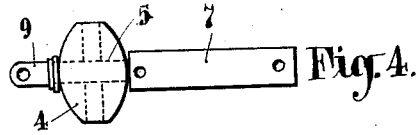
Figure 4 is a plan view of a fitting to which wing plates are attached.
Figure 5:
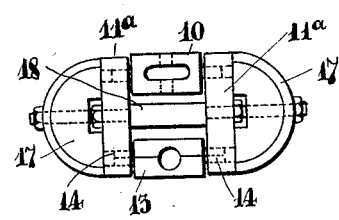
Figures 6, 7:
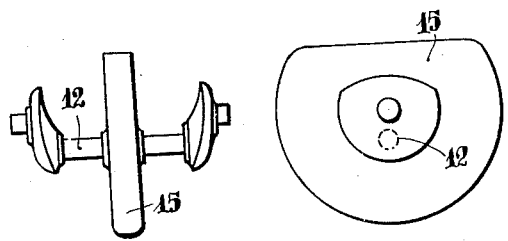
Figure 6 is a view of the crank shaft detached.
Figure 7 is an end view of Figure 6.
Figure 8:
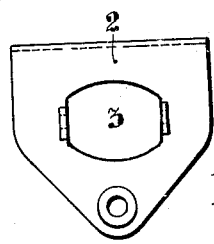
Figure 8 is a side elevation of a mounting plate.

According to a convenient embodiment of the invention, the body of the bird is formed as a hollow aluminium or like casting and is provided with a suitable bracket by which the mascot may be attached to the car. A rectangular shaped portion 1 forms part of the top face of this body portion, and carries the wings and the mechanism for effecting the simultaneous flapping movement of the wings, and for effecting a tilting of the wings at the end of each stroke. This mechanism is mounted on a sheet metal frame 2 which is riveted to the underside of the portion 1 of the body. This frame has two depending lugs which have perforations 3 therein near the top, and a barrel or other shaped member 4 is rotatably mounted inside each of these perforations. The outer frame 1 that is the portion forming part of the body of the bird, is also suitably cut or formed to allow the barrel members to rotate. A pin or shaft 5 passes diametrically through each of these barrel members in a direction at right angles to the side pins 6 on which such member 4 rotates. This pin or shaft 5 is extended beyond the inner end and outer faces of the barrel member, and the outer extension 7 is adapted to carry the wings 8 of the device. Each wing is formed of two sheet aluminium plates, one of which is bent around the extended pin or shaft at the front or leading edge and tapers towards the other plate at the rear edge, the wing being hollow. The front and rear edges of the wings are suitably shaped and may also be marked to represent the feathers. The inner extensions 9 of the aforesaid pins are provided with flats on diametrically opposite sides and each engage a correspondingly shaped slot in a member 10 rotatable about an axis at right angles to the said pin. This member is rotatably mounted in the connecting links 11, and near the top edge thereof, and the up or down movement of the winds causes a movement, in the opposite direction, of the said connecting links 11. Near the lower edge of the connecting links 11 a crank 12 is journalled in the blocks 13, pivotally carried by the pins 14 in the connecting links 11. The ends of the crank shaft 12 are mounted in the said depending lugs on the sheet metal frame 2. Thus it will be seen that whilst the pin 5 carrying the wings moves in a vertical direction only, the crank 12 moves in a circular path. Thus when the wings flap up and down the crank aforementioned rotates and causes the connecting links 11 to oscillate about the point of connection to the wing-carrying pin 5 and, as this pin or shaft is journalled in the barrel member and has flats at the inner end in engagement with the blocks 12, it must move therewith and therefore the wing is tilted about the carrying shaft at the end of each up and down stroke. To secure a balance of the reciprocating parts and to assist the movement of the crank over the top and bottom centres, an eccentrically arranged lead or like flywheel 15 is mounted on the crank. The weighted part of this flywheel is arranged to come at or just past the top and bottom dead centre when the wing reaches the limit of the upward or downward stroke, so that the weighted portion will assist the rotation of the flywheel and therefore assist the tilting of the wing to expose the top face thereof, for the downward stroke and the bottom face for the upward stroke. A pair of "hair pin" type springs 16 are fixed at one end to the frame 2 of the device and at the other end to the crank operated member 11 and are so arranged that when the weighted portion of the flywheel is falling over the top dead centre, the springs are compressed and when the said weighted portion reaches the bottom dead centre the springs are expanded to act on the rear end of the member 11, and thereby assist the turning of the crank operated frame at the bottom and top dead centres. A uniform and balanced movement is given to all the reciprocating parts. The front and rear edges of the member 11 are also weighted conveniently by semi-circular discs of lead 17 to assist in the balancing of the parts. Each member 11 comprises two blocks 11a connected together by the centre pin 18 which also fixes the lead pieces thereto.

By this invention therefore a bird mascot for a motor vehicle is constructed wherein the bird's wings are caused to flap by wind pressure incident thereon, and by a very ingenious arrangement the wings are turned at the end of each flapping stroke to expose the opposite face of the wings to the wind.

In lieu of the wings being driven by the wind, the crank may be rotated, and the wings may act as propelling members.

Claims:

1. A wind actuated device comprising a frame, a bearing mounted on the frame to oscillate about a substantially horizontal axis, a wind plane having a pin thereon which passes through the bearing member and is adapted to oscillate therein about an axis at right angles to the first mentioned axis, a crank pin mounted on the said frame and adapted to continuously revolve when the device is in action, and means connecting the crank pin with the said pin on the wind plane so that when the wind plane oscillates about a substantially horizontal axis the crank pin is continuously rotated in the same direction to thereby cause the wind plane to also oscillate about the axis of the said pin.

2. A wind actuated device comprising a frame member, a bearing member mounted on the frame to oscillate about a substantially horizontal axis, a wind plane having a pin thereon which passes through the bearing member and is adapted to oscillate therein about an axis at right angles to the first mentioned axis, a crank pin mounted on the said frame, a connecting member mounted on the crank pin, a block pivotally mounted on the connecting member to oscillate about an axis at right angles to the crank pin, and means for pivotally connecting the pin on the wind plane to the said block to pivot about an axis at right angles to the pivot axis of the block.

3. A wind actuated device comprising a frame, a bearing member mounted on the frame to oscillate about a substantially horizontal axis, a wind plane having a pin thereon which passes through the bearing member and is adapted to oscillate therein about an axis at right angles to the first mentioned axis, a crank pin mounted on the said frame, a connecting member, a joint member pivotally mounted on the said connecting member and journalled on the crank pin, a block pivotally mounted on the connecting member to oscillate about an axis at right angles to the crank pin, and means for pivotally connecting the pin on the wind plane to the said block to pivot about an axis at right angles to the pivot axis of the block.

4. A wind actuated device comprising a frame, a bearing member mounted on the frame to oscillate about a horizontal axis, a wind plane having a pin thereon which passes through the bearing member and is adapted to oscillate therein about an axis at right angles to the first mentioned axis, a crank pin mounted on the said frame, a connecting member, a joint member pivotally mounted on the said connecting member and journalled on the crank pin, weights on each side of the connecting member, a block pivotally mounted on the connecting member to oscillate about an axis at right angles to the crank pin, and means for pivotally connecting the pin on the wind plane to the said block to pivot about an axis at right angles to the pivot axis of the block.

5. A wind actuated device comprising a frame, a bearing member mounted on the frame to oscillate about a substantially horizontal axis, a wind plane having a pin thereon which passes through the bearing member and is adapted to oscillate therein about an axis at right angles to the first mentioned axis, a crank pin mounted on the said frame, a connecting member, a joint member pivotally mounted on the said connecting member and journalled on the crank pin, weights on each side of the connecting member, a spring device to assist the rotation of the crank pin over the top and bottom dead centres, a block pivotally mounted on the connecting member to oscillate about an axis at right angles to the crank pin, and means for pivotally connecting the pin on the wind plane to the said block to pivot about an axis at right angles to the pivot axis of the block.

6. A wind actuated device comprising a frame, a bearing member mounted on the frame to oscillate about a substantially horizontal axis, a wind plane having a pin thereon which passes through the bearing member and is adapted to oscillate therein about an axis at right angles to the first mentioned axis, a crank pin mounted on the said frame member, a weight fixed on the crank pin to balance the wind plane and to assist the crank pin passing over the dead centres, a connecting member, a joint member pivotally mounted on the said connecting member and journalled on the crank pin, weights on each side of the connecting member, a spring device to assist the rotation of the crank pin over the top and bottom dead centres, a block pivotally mounted on the connecting member to oscillate about an axis at right angles to the crank pin, and means for pivotally connecting the pin on the wind plane to the said block to pivot about an axis at right angles to the pivot axis of the block.

JOHN BROWN.
EDWARD BROWN.